(12) United States Patent
Madhavan et al.

(10) Patent No.: US 9,819,759 B2
(45) Date of Patent: Nov. 14, 2017

(54) INTER-SITE INTEGRATION PLATFORM FOR COMMUNICATION BETWEEN SOCIAL NETWORKING SITES

(71) Applicant: Oracle International Corporation, Redwood Shores, CA (US)

(72) Inventors: Srinivasan Madhavan, Andhra Pradesh (IN); Darren Michael Guilbert, New South Wales (AU)

(73) Assignee: Oracle International Corporation, Redwood Shores, CA (US)

(*) Notice: Subject to any disclaimer, the term of this patent is extended or adjusted under 35 U.S.C. 154(b) by 583 days.

(21) Appl. No.: 14/074,630

(22) Filed: Nov. 7, 2013

(65) Prior Publication Data
US 2015/0127729 A1    May 7, 2015

(51) Int. Cl.
G06F 15/16 (2006.01)
G06F 15/173 (2006.01)
H04L 29/08 (2006.01)
G06F 17/30 (2006.01)

(52) U.S. Cl.
CPC .... H04L 67/2823 (2013.01); G06F 17/30867 (2013.01)

(58) Field of Classification Search
CPC .................. H04L 29/08; H04L 67/10
USPC .......... 709/204, 249, 244, 206, 207
See application file for complete search history.

(56) References Cited

U.S. PATENT DOCUMENTS

| | | | |
|---|---|---|---|
| 7,966,297 B2 | 6/2011 | Guilbert | |
| 2009/0222464 A1 | 9/2009 | Guilbert | |
| 2011/0238766 A1* | 9/2011 | Lew | H04L 12/588 709/206 |
| 2013/0018948 A1* | 1/2013 | Douillet | G06F 9/541 709/204 |
| 2014/0006977 A1* | 1/2014 | Adams | H04L 51/32 715/758 |
| 2014/0074824 A1* | 3/2014 | Rad | G06Q 50/01 707/722 |
| 2014/0081994 A1* | 3/2014 | Becker | G06F 17/30693 707/749 |
| 2014/0244761 A1* | 8/2014 | Dale | G06Q 50/01 709/204 |

* cited by examiner

*Primary Examiner* — Ario Etienne
*Assistant Examiner* — Sahera Halim
(74) *Attorney, Agent, or Firm* — Vista IP Law Group, LLP

(57) ABSTRACT

A method, system, and computer program product for data mining and analytics from social networking sites. One method commences upon receiving a social event from a first social networking site, classifying the social event to determine a social site action, and modifying at least some aspect of the social event to create a modified social event based at least in part on the classification. The modified social event is broadcasted to additional social networking sites. An incoming social event may be subjected to security processing before classification, and social networking sites to receive a broadcasted message may be determined based at least in part on the classification.

23 Claims, 8 Drawing Sheets

INTER-SITE INTEGRATION PLATFORM FOR COMMUNICATION BETWEEN SOCIAL NETWORKING SITES

FIELD

The disclosure relates to the field of data mining and analytics and more particularly to techniques for processing social networking site events across multiple social networking nodes.

BACKGROUND

Over recent times, there has been an amazing growth in the number of social networking sites (e.g., Facebook, Twitter, etc.), and there has been an explosion in the number of users of these social networking sites. Each day there is a huge amount of information being stored in these sites, and much of it is made available by users for sharing.

Even with the rapidly increasing number of social networking sites, there has yet to emerge any standardized manner to communicate between these sites. Generally, social networking sites have relied on their own proprietary techniques for interacting with users and for performing their various corresponding social networking site actions (e.g., check status, write on a wall, etc.).

As a consequence, the various social networks are isolated from each other even while they may each provide services to the same user. Even though there is a large following of users in each social networking site who would benefit from a seamless exchange of information between these networks, there has emerged no clear integration platform for information exchange between social networks. Moreover, even though users wish to ease the burden of coordinating posts and other activities between multiple social networking sites, and even though there is a great deal of synergy that can accrue to the process of collecting and analyzing cross-site user data (or metadata), the cost of collecting and analyzing cross-site user data remains prohibitive for all except the most important and/or lucrative endeavors.

A "Tower of Babel" scenario becomes apparent when assessing the myriad access techniques used by each social networking site. Building point-to-point software integrations between applications and individual social networking sites is expensive. Worse, maintaining cross-site integrations based on point-to-point access and integration techniques sets up a never-ending need for development of ever more of these point-to-point integrations as new social networking sites emerge.

What is needed is an environment that facilitates ease of building and scaling applications (e.g., business applications) that can communicate between social networks.

None of the aforementioned point-to-point or other legacy approaches achieves the capabilities of the herein-disclosed configurable platform for processing social networking site events across multiple social networking nodes. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for implementing a configurable platform for processing social networking site events across multiple social networking nodes.

The disclosure includes methods, systems, and computer program product implementations for facilitating collaboration (e.g., including data mining and analytics) across social networking sites. One method commences upon receiving a social event from a first social site, classifying the social event to determine a social site action, and modifying at least some aspect of the social event to create a modified social event based at least in part on the classification. The modified social event is broadcasted to one or more additional social sites. An incoming social event may be subjected to security processing before classification, and sites to receive a broadcasted message may be determined based on the classification.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Figure 1:
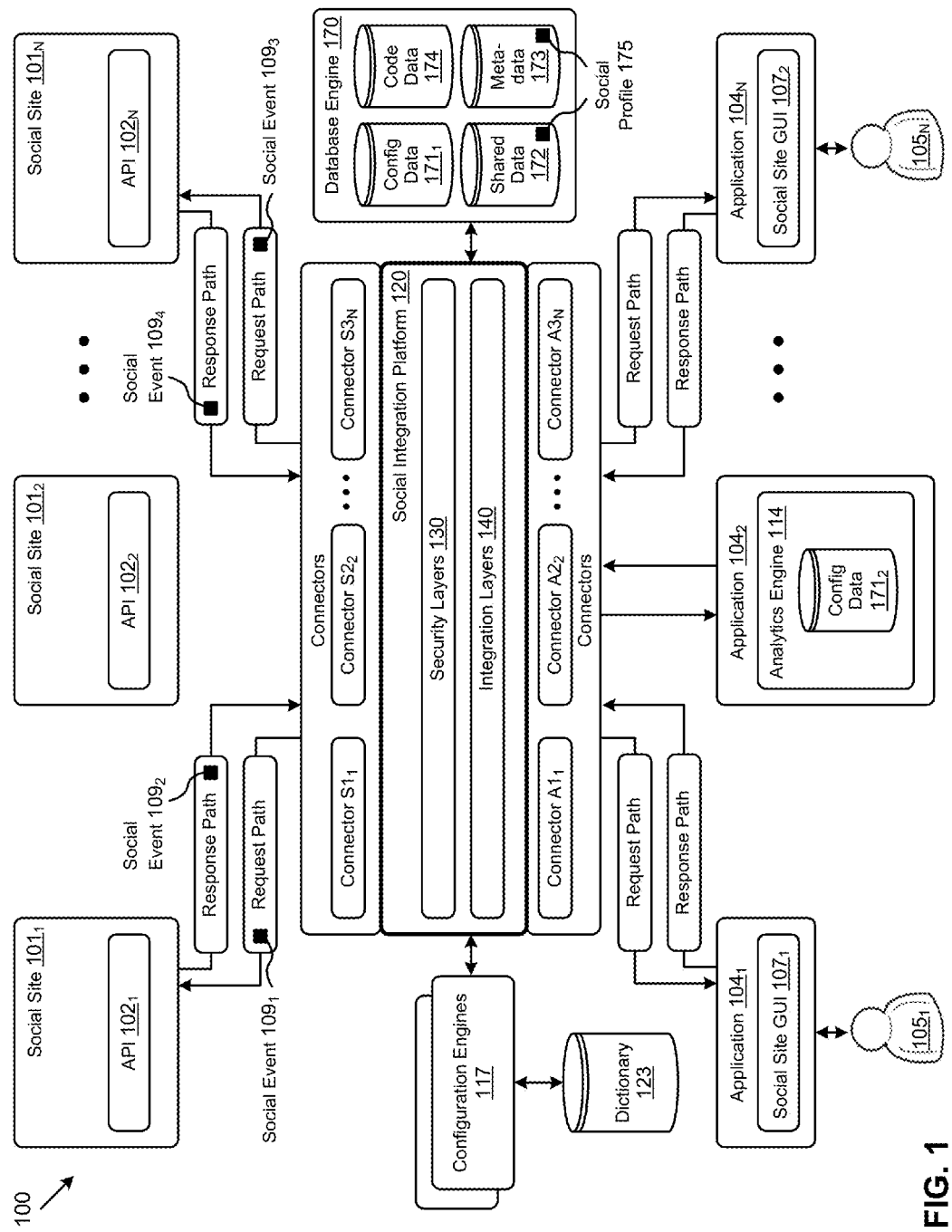
FIG. 1 is a block diagram of an environment comprising a configurable platform for processing social networking site events across multiple social networking nodes, according to some embodiments.

Some embodiments of the present disclosure address the problem of the rapid increase in the number of social networking sites—and the incompatibilities of their respective proprietary access interface methods and APIs. Some embodiments are directed to implementations of common event and data representation formats. Some embodiments are directed to implementations of a common processing layer. More particularly, disclosed herein and in the accompanying figures are exemplary environments, methods, and systems for processing social networking site events and their payload across multiple social networking nodes.

Overview

Even though there is a great deal of synergy that can accrue from the process of collecting and analyzing cross-site user data or metadata and broadcasting user data or metadata, the cost of collecting and analyzing cross-site user data remains prohibitive for all except the most important and/or lucrative endeavors. What is needed is an environment and/or framework, and/or integration platform that facilitates ease of building and scaling applications (e.g., business applications) that can communicate between social networks.

For example, when recruiting to fulfill an open job requisition, a person (e.g., a recruiter) might look for candidates at some particular social networking site, and then might wish to find additional candidates at another social site. Or, the recruiter might wish to cross-correlate information gathered at one site with information gathered at another site. To do so manually requires an inordinate amount of human-machine interaction and, often, such an ad hoc approach results in poor data gathering and even poorer cross-correlation.

A common integration platform such as is disclosed herein brings to bear standards for information sharing by and between the social networks (e.g., via cross-site sharing and/or broadcasting). One example where standards can be applied include common use models pertaining to commonly deployed features such as enforcement of user privacy policies (e.g., what sort of information is shared publicly, and what sort of information is shared with specific restrictions) and business policies (e.g., what sort of information is shared with specific restrictions and/or what sort of information is embargoed until expiration of a time period, etc.). Other examples where standards can be applied include data formatting (e.g., how a contact or name should be formatted).

One legacy approach might be to foist or otherwise "force-fit" a standard representation and communication model onto the social site provider and/or their developers, however this approach can be predicted to fail. Another approach is to provide a seamless integration platform that can communicate between multiple social networking sites. Developers can continue to use their choices for their own data representation and for their own communication models.

Immense business value can be derived from the shared data found (and correlated) using these multiple social sites. The aforementioned approach to provide a common platform has the potential to reduce the complexity of integrating across diverse social networks, thus freeing up resources to focus on mining the value from the shared data rather than spending resources building ever more point-to-point integrations that rely on the proprietary site-by-site access methods and/or APIs that each individual social network provider may have exposed in an attempt to facilitate information retrieval.

A social site integration platform such as disclosed herein serves to expedite the creation of social integration applications. In embodiments of the social site integration platform disclosed herein, exemplary architectures introduce a layer (e.g., an integration layer, an integration module, and integration interface, etc.) between one social network provider (e.g., a social node such as Facebook) and another social network node (see FIG. 1). In some situations the layer facilitates one or more modes of interaction between two or more social networks (e.g., between a social node such as Facebook and a social node such as Twitter). The layer provides a common interface (e.g., a common set of web services, a common set of communication protocols, a common regime for data representation, a common dictionary of abstractions, etc.) to applications that can then address multiple social sites using the common interfaces. This layer and/or its sub-layers and/or its abstractions handle site-dependent interactions as may be required by the social networks involved. In some cases, processing is performed in order to mediate conflicting and/or incompatible representations that may occur between any two or more site-dependent interactions.

A social network can be termed a social node. A social node serves as an event producer (e.g., producing social events) and as an event consumer (e.g., consuming social events). A social event can be strictly an occurrence of some event (e.g., an expiration of some particular time period) or a social event can be an item comprising associated data such as the text (and metadata) of a tweet, or such as the contents (and metadata) of a wall post. Or, in some settings, the mode of transmission of data of a social event can be referred to as a social event (e.g., "I tweeted to my followers a list of my top favorite colors").

To illustrate and augment the foregoing, the following figures and corresponding text descriptions address:

Various standardized manners of sharing information.
Exposition of web services to facilitate integration standardization.
Exemplary uses of industry standards such as HTML, XML, WSDL and HRXML, etc.
Architectures and partitions to promote seamless integration with multiple social networking sites.
Plug-in facilities to support application access to new or additional social networking sites.
Federation of social networking concepts to support processing performed within the social layer.
Treatment of metadata, trends and analytics within the social layer.
Automated mediation facilities to resolve conflicting or incompatible communications or representations that can arise during information exchange between nodes.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1 is a block diagram of an environment 100 comprising a configurable platform for processing social networking site events across multiple social networking nodes.

As shown, several social networking sites 101 (e.g., social site $101_1$, social site $101_2$, social site $101_N$, etc.) are in communication with users 105 (e.g., user $105_1$, user $105_N$) through applications 104 (e.g., application $104_1$, application $104_2$, application $104_N$, etc.). A user can create a social event by interacting with an application, possibly through a social site GUI 107. A social site GUI might be implemented as a web page as provided by a corresponding social site or agent. In other cases a social site GUI might be implemented as an application (e.g., a mobile terminal "app") for hosting on a mobile terminal (e.g., smartphone, PDA, etc.).

The aforementioned social event (e.g., a post or tweet, etc.) might be created by a user. For example, a user might want to update a status. Using an application, the user can send aspects of the nature of the occurrence and other aspects together with the social event to the social site over a request path (as shown). The social site can respond to the "status change" social event (e.g., social event $109_1$) with another social event in the form of an acknowledgement of the status change (e.g., social event $109_2$).

Communication of such social events to/from the social site occurs over a request path (as shown). And, sending of a response from the social site to the requesting user can occur over a response path (also, as shown).

The syntax and format of a social event is specific to each social site. For example, social site $101_1$ might have a syntax and format that differs from the syntax and format used by social site $101_N$, even though the semantics might be similar or nearly the same, or even identical. Further, each social site might expose respective access interfaces, access methods, and/or otherwise provide access such as by providing respective interface methods and/or application programming interfaces 102 (e.g., API $102_1$, API $102_2$, API $102_N$, etc.).

A user can initiate the occurrence and can create the payload of a social event. As examples, if a user posts to a wall, the event and the contents of the post can be delivered to a social site via network-based passing of social events and respective data payloads. Or, a social site can initiate the occurrence of, and create, the payload of a social event. As an example, if a first user posts to a second user's wall, that event and possibly also the contents of the post can be delivered to the second user by the social site initiating the sending of a social event.

FIG. 1 also depicts a social integration platform 120, which social integration platform comprises security layers 130 and integration layers 140. Social events traverse the social integration platform through connectors facing social sites (e.g., connector $S1_1$, connector $S2_2$, connector $S3_N$, etc.), and through connectors facing applications (e.g., connector $A1_1$, connector $A2_2$, connector $A3_N$, etc.). The connectors facing applications connect with applications.

One of the shown applications further connects to an analytics engine 114. The application $104_2$ in cooperation with analytics engine 114 serve to receive and analyze social events from a social site (or from an application), and to generate further social events, possibly destined for a social site or application other than the originating social site or application. Such a generated social event can traverse one or more integration layers 140 and one or more security layers 130 (see FIG. 3).

The analytics engine processes social events and its respective metadata, and can identify and publish trends and other analytics. As earlier indicated, when a social event occurs it can precipitate the formatting of a social event data structure with a payload. In some cases a social event can be generated by an analytics engine, and such generated social events can be formatted to carry with them analytical information such as statistical information or information that a given user has chosen to share. Such information can be used to build a social profile 175. A social profile can pertain to an identifiable individual user, and/or a social profile can pertain to demographic information that correlates to a particular group of users. Such profiles are used in further processing, such as for extracting trends, and/or for further processing resulting in still further analytics, and/or for publishing social events (possibly including data derived from the analytics engine 114) to other social sites.

To facilitate the latter operations, namely publishing social events to other social sites, the social integration platform 120 might perform generalizations and/or mapping (see FIG. 3) to standardize on a set of common social networking concepts as are practiced by any one or more of the various social sites. Such a mapping can be performed within the social integration platform.

Strictly as examples, a given social network promulgates its own syntax and terminologies for describing features. The terminology and syntax used by any pair or social sites may differ—even though the differing syntaxes may be semantically identical. In some cases, the differing syntaxes may not be semantically identical, but rather be parallel in concept. To facilitate implementation of a common interface (e.g., a common set of web services, a common set of communication protocols, a common regime for data representations, etc.) a mapping function can use a dictionary of abstractions (e.g., see dictionary 123). A common platform such as the shown social integration platform 120 can be configured using one or more configuration engines 117, which in turn can be used to access a dictionary. Some examples of semantically similar concepts between two social sites are given in Table 1.

TABLE 1

| | Semantically similar concepts | |
|---|---|---|
| Term Used by Site #1 | Term Used by Site #2 | Common Semantics |
| "like" (e.g., in Facebook) | "+1" (e.g., in Google plus) | A positive indication from a user applying to a particular object |

TABLE 1-continued

Semantically similar concepts

| Term Used by Site #1 | Term Used by Site #2 | Common Semantics |
|---|---|---|
| "wall post" (e.g., in Facebook) | "tweet" (e.g., in Twitter) | Post a free-form message for presentation to one or more users |
| "status update" (e.g., in Facebook) | "tweet" (e.g., in Twitter) | Post a status-update message for presentation to one or more users |
| "news feed" (e.g., in Facebook) | "all updates" (e.g., in LinkedIn) | Stream information |
| Friend Recommendation (FB) | People You Might Know (LinkedIn) | Suggested contacts based on profile and connections |
| Friend Recommendation (FB) | You May Know (Google+) | Suggested contacts based on profile and connections |
| Circles (Google+) | Your Network (LinkedIn) | Visual Connection Summary or overview |
| Messages (FB) | Notifications dropdown (LinkedIn) | Push (SMS, Email) and Pull (Messaging, Alerts) style Notifications |
| Messages (FB) | Notifications bell icon (Google+) | Push (SMS, Email) and Pull (Messaging, Alerts) style Notifications |
| Followers (FB) | Followers (Twitter) | Members of the public interested in befriending |
| A Google+ Hangout | Group video calls | Video conferencing |
| Google+ Circles | Facebook Friend List | A group of contacts |
| A Facebook Add Photos/Videos | Photos/Video in Google+ | Adding non-text content such as still images or video clips |
| A Facebook Chat | Google Chat | Chat mode of communication among friends |
| LinkedIn Follow | Twitter Follow | Feature to monitor content of a person or group |

A dictionary can be stored outside of a social integration platform, or within a particular partition of a social integration platform, or can be stored in a database engine 170. A database engine can serve to hold any forms of configuration data 171 (possibly including a dictionary), shared data 172, metadata 173, code data 174, and other persistent or volatile storage. A database cache 377 (see FIG. 3) might be used to facilitate fast access.

As earlier indicated, a social site user can initiate the occurrence of a social event, and such a user can do so using a wide variety of devices (e.g., desk-side or laptop computer, PDA, smartphone, etc.). For example, a user can use a smartphone to post to a wall, and that event (and the contents of the post) can be delivered to a social site via network-based passing. A network architecture supporting such devices, and network-based passing of social event data, is presently discussed.

Figure 2:
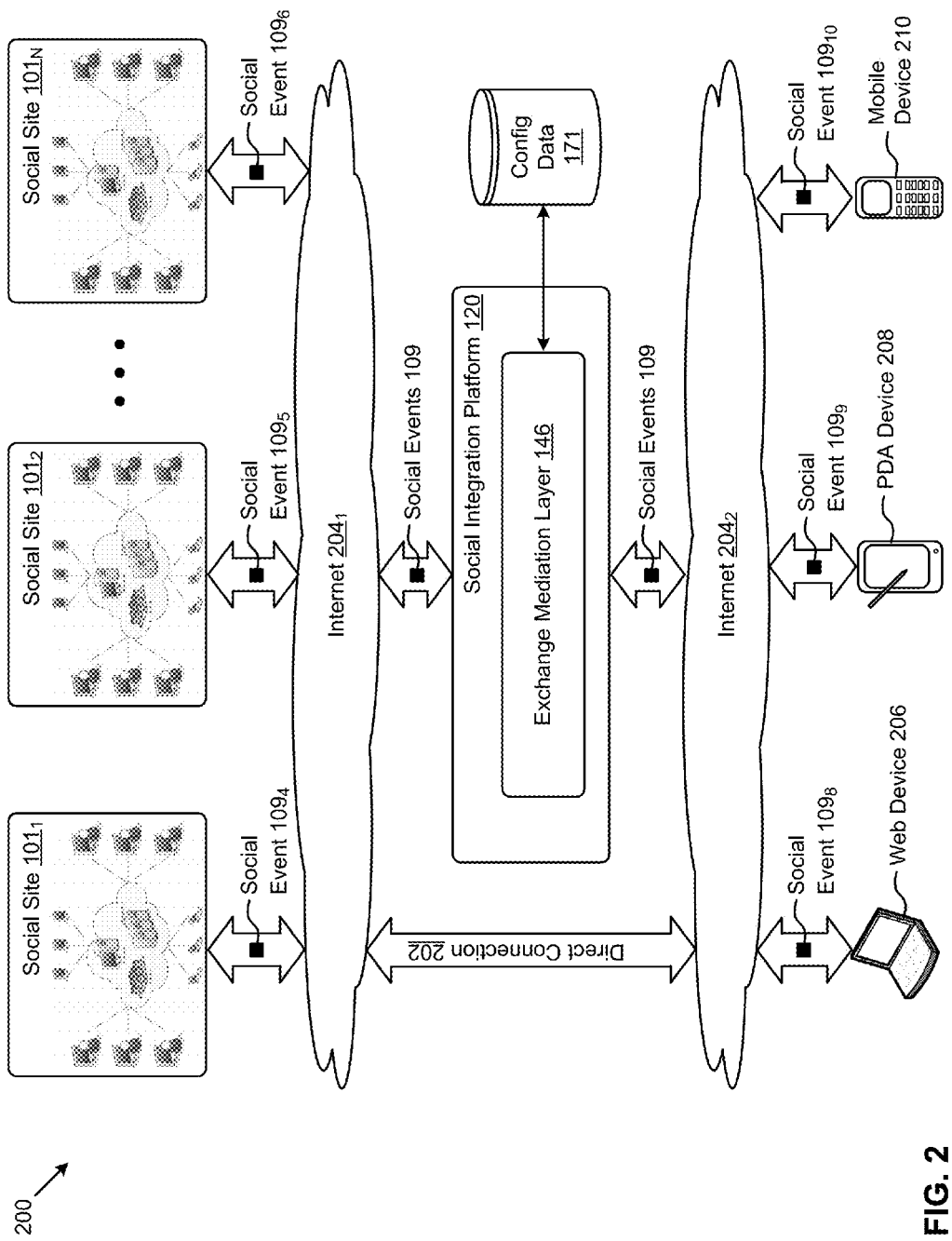
FIG. 2 depicts a network architecture for network-based passing of social event data payloads through a configurable platform, according to some embodiments.

FIG. 2 depicts a network architecture 200 for network-based passing of social event data payloads through a configurable platform. As an option, the network architecture 200 or any aspect thereof may be implemented in the context of the architecture and functionality of the embodiments described herein.

As shown, the architecture includes multiple social sites (e.g., social site $101_1$, social site $101_2$, and social site $101_N$), multiple Internet sub-nets (e.g., internet $204_1$, internet $204_2$), and multiple user devices (e.g., corresponding to a web user device 206, a PDA device 208, a mobile device 210, etc.). A social event can pass through social integration platform 120. More particularly, social event $109_4$ and social event $109_5$ and social event $109_6$ can be passed to the social integration platform to reach the exchange mediation layer 146. Processing is performed by the exchange mediation layer in order to mediate conflicting and/or incompatible representations that may occur between any two or more of social event $109_4$, social event $109_5$, and social event $109_6$.

As shown, communication between a user device and a particular social site can be carried out using a direct connection. The presence of an instance of a social integration platform 120 does not preclude legacy communications. However, in the event of communication between a user device and a particular social site being carried out using a direct connection 202, the social integration platform 120 might not be able to access aspects of the communication that are delivered over the direct connection until the social integration platform issues a query to the corresponding social site. Nevertheless, with some small latency, a social integration platform can "listen" to social conversations. Accordingly, the social integration platform can analyze social conversations to collect explicit and inferred information and perform analytics. Processing this metadata and analyzing the explicit and inferred information from the social conversations can predict trends, which in turn can be used in decision-support systems (e.g., to advance some particular business purpose).

The exchange mediation layer 146 can further be deployed to mediate a social event originating from one site in order to publish the social event to another social site. For example, a user's status update to one social site (for example, Facebook) can be automatically reformatted and then propagated to another social site (e.g., using a Twitter tweet). Additional acts of mediation (e.g., translation, feature replication, feature collapse, message filtering, etc.) can be performed by the exchange mediation layer 146. Additional mediation types and descriptions follow in Table 2.

TABLE 2

Additional mediation types

| Mediation Type | Description |
|---|---|
| Propagation | Broadcast updates across social sites |
| Match Resolution | Match profiles of contacts for the same entities that match across social sites |
| Outreach Communication | Attempt to reach a contact through whichever site or sites the contact is presently online |
| Moderation | Limit use of language to only language allowable for a business (e.g., configured to moderate certain words that are not advisable in a social media setting |

Moderation, translation, feature replication and/or feature collapsing, and message enhancement and/or filtering can occur within any one or more mediation layers. This mechanism can be implemented as a plug-in within a plugable architecture where various processors and/or filters (e.g., plug-ins implementing a SocialFilter interface) can be applied against a SocialEvent. Some example of plug-ins include:

Apply language translations, abuse filters, and blocking filters.

Prune or limit or reformat message content to facilitate display on real estate-constrained devices (e.g., smartphones).

Inflate the contents of a SocialEvent with additional content.

Perform keyword or keyphrase searches over the contents of a SocialEvent to provide demographics for the users' interests.

Augment a user's SocialProfile with demographics pertaining to the users' interests.

Profile matching to use a user's SocialProfile to match against other profiles (e.g., other user's profiles found at a second social site) and/or to match to job profiles (e.g., in a recruiting setting).

Use a job profile to match against a set of users' SocialProfile configurations (e.g., in a recruiting setting).

The foregoing are merely examples and other forms of analytic processing and actions performed in response to the analytic actions are possible. Additional situations where the social integration platform can analyze social conversations and perform analytics are presented hereunder pertaining to the discussion of FIG. 4.

Returning to the discussion of elements within the environment 100 as depicted in FIG. 1, a social integration platform 120 can interface be configured using configuration data 171, possibly in combination with configuration engines 117, which social integration platform can in turn provide configuration data comprising user preferences to the exchange mediation layer. For example, configuration data can specify propagation targets (e.g., from among a set of multiple social sites) to which a particular type of social event should be propagated. Propagation rules can be codified to support a one-to-one regime, or can be codified to support a one-to-many regime. In some cases the propagation regime and any respective configuration settings is selected based on the type of social event to be propagated.

Figure 3:
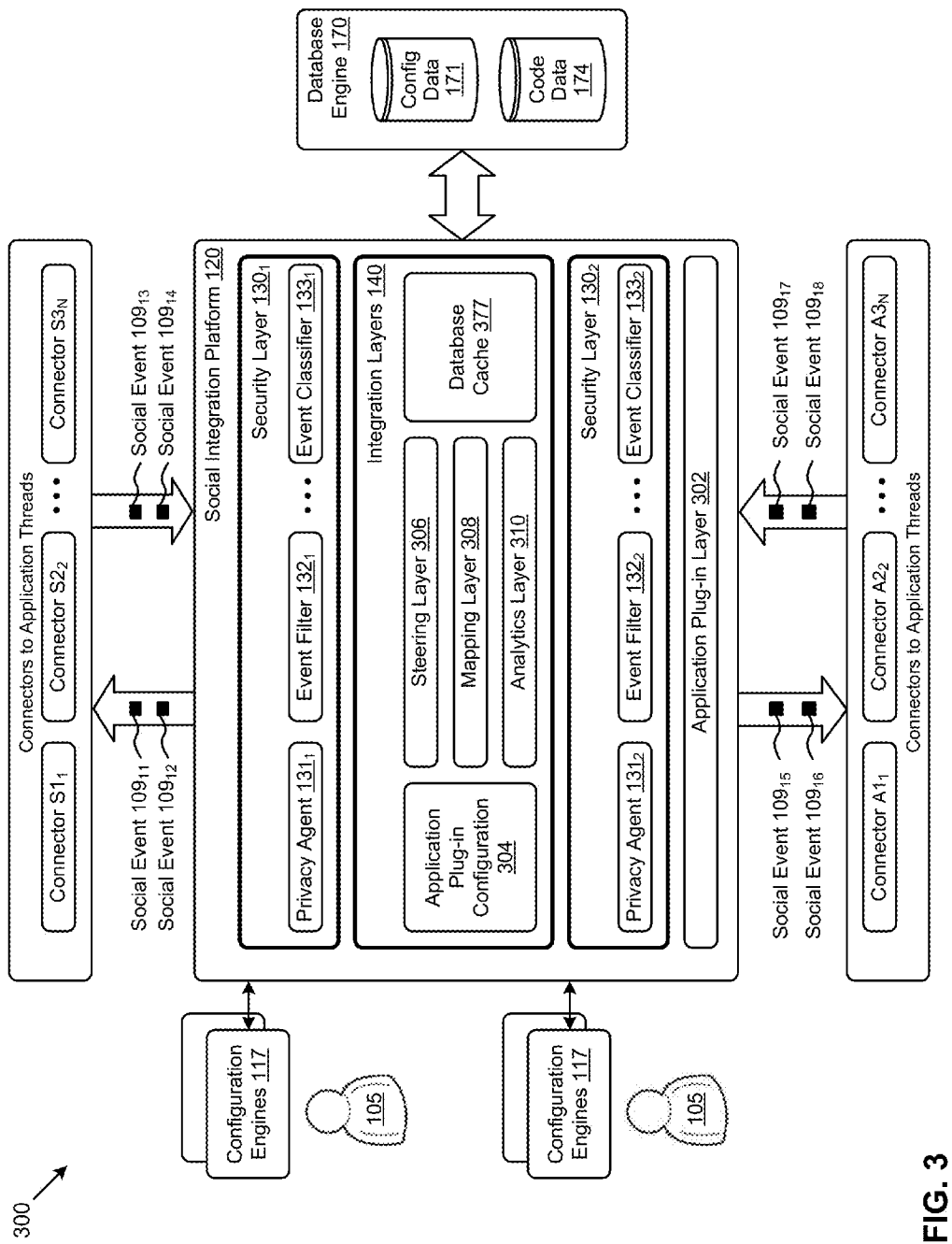
FIG. 3 is a block diagram of a sample architecture to implement a configurable platform for processing social networking site events across multiple social networking nodes, according to some embodiments.

FIG. 3 is a block diagram of a sample architecture 300 to implement a configurable platform for processing social networking site events across multiple social networking nodes. As an option, the present architecture 300 or any aspect thereof may be implemented in the context of the architecture and functionality of the embodiments described herein. Also, the architecture 300 or any aspect thereof may be implemented in any desired environment.

As shown, the architecture of the social integration platform 120 includes security layers 130. In the present diagram the security layers comprise a social site facing security layer $130_1$ and an application facing security layer $130_2$. The security layers are configured to perform aspects of authentication, permission and encryption. Additionally, security layers are configured to observe and/or enforce privacy settings. As an example, the configuration data 171 can comprise privacy settings to limit the propagation of certain types of social events to another social site.

Now, returning to the applications 104 (see FIG. 1), the applications can be configured based on plug-ins. To facilitate use of application plug-ins, the architecture 300 includes an application plug-in layer 302. The shown application plug-in layer can serve application code (e.g., plug-in code from any instances of code data 174) to requesting applications. Further, one or more components of the integration layers, such as application plug-in configuration 304, can serve user configurations and settings to requesting applications, and/or settings from application plug-in configuration 304 can be used by any component of the social integration platform (e.g., the integration layers 140, as shown).

Strictly as an example, an application plug-in and/or its application plug-in configuration can facilitate integration with newly-available social networking sites. For example, an application plug-in configuration can include a data structure similar to the herein-provided Table 1. A user or business policy may specify one or more actions to opt in (or opt out) of specific interactions with specific social networks at any point in time.

The social integration platform 120 facilitates this process by codifying each social network into a data structure. The social integration platform can support any number or type of social site (e.g., past, present and future social sites). The foregoing data structure can be named such as SocialNode (see FIG. 4). A SocialNode comprises characteristics that can be modeled in such a manner that any entity deemed to be a SocialNode can produce or consume social events. The specific manner in which a particular social site interacts with a social integration platform 120 can be at least partially codified in a plug-in. For example, in an object-oriented design discipline, any entity deemed to be a SocialNode can use abstract classes and interfaces. Implementation of any particular method can conform to given abstract classes and interfaces.

Now, again referring to the shown integration layers 140, a steering layer 306 can use configuration data to propagate a social event to other social sites. In exemplary cases, a social event of a particular semantic may have a correspondence in one or more other social sites—even though any one or more of the other social sites may have site-by-site differing syntax. As such, a steering layer 306 may cooperate with a mapping layer 308. The mapping layer can receive a social event from a first site, determine the semantics inherent or included in the social event from the first site, and map the first site social event to a second site social event while observing the syntax as may be required by a second site.

Integration layers within a social integration platform can also comprise an analytics layer 310. The analytics layer can provide common services to an analytics engine 114. For example, an analytics layer may be configured to cross-correlate social events from a first social site with social events at a second social site. In some cases such cross-correlation can result in the emergence of personally-identifiable information. In such cases a business policy might influence the analytics layer 310 to mask the personally-identifiable information such that it cannot be retrieved by an external application (e.g., applications 104) and/or such that it cannot be retrieved by an external analytics engine 114.

The foregoing integration layers may be purposely partitioned so as to be wrapped by security layers. The security layers (e.g., security layer $130_1$, security layer $130_2$) can be configured to handle security-related issues such as authentication, encryption and privacy. In some cases, the payload of a site event might need to be decrypted before it can be classified (e.g., classified into a "check status" action, or a "write on a wall" action, or other social site actions, etc.). And, a decrypted site event might need to be classified before it can be processed by a privacy agent or event filter. As such, instances of security layers comprise event classifiers 133 (e.g., event classifier $133_1$, event classifier $133_2$), event filters 132 (e.g., event filter $132_1$, event filter $132_2$), and privacy agents 131 (e.g., privacy agent $131_1$, privacy agent $131_2$).

Security functions might be performed by the security layers or, in some cases, the certain security functions are performed by the connectors sites (e.g., see connector $S1_1$, connector $S2_2$, connector $S3_N$, connector $A1_1$, connector $A2_2$, and connector $A3_N$). For example, IP security protocols (e.g., IPsec) might be performed within, or in conjunction with a connector.

As heretofore indicated, a social integration platform uses data structures. A sample of such data structures and a corresponding class hierarchy is presently discussed.

Figure 4:
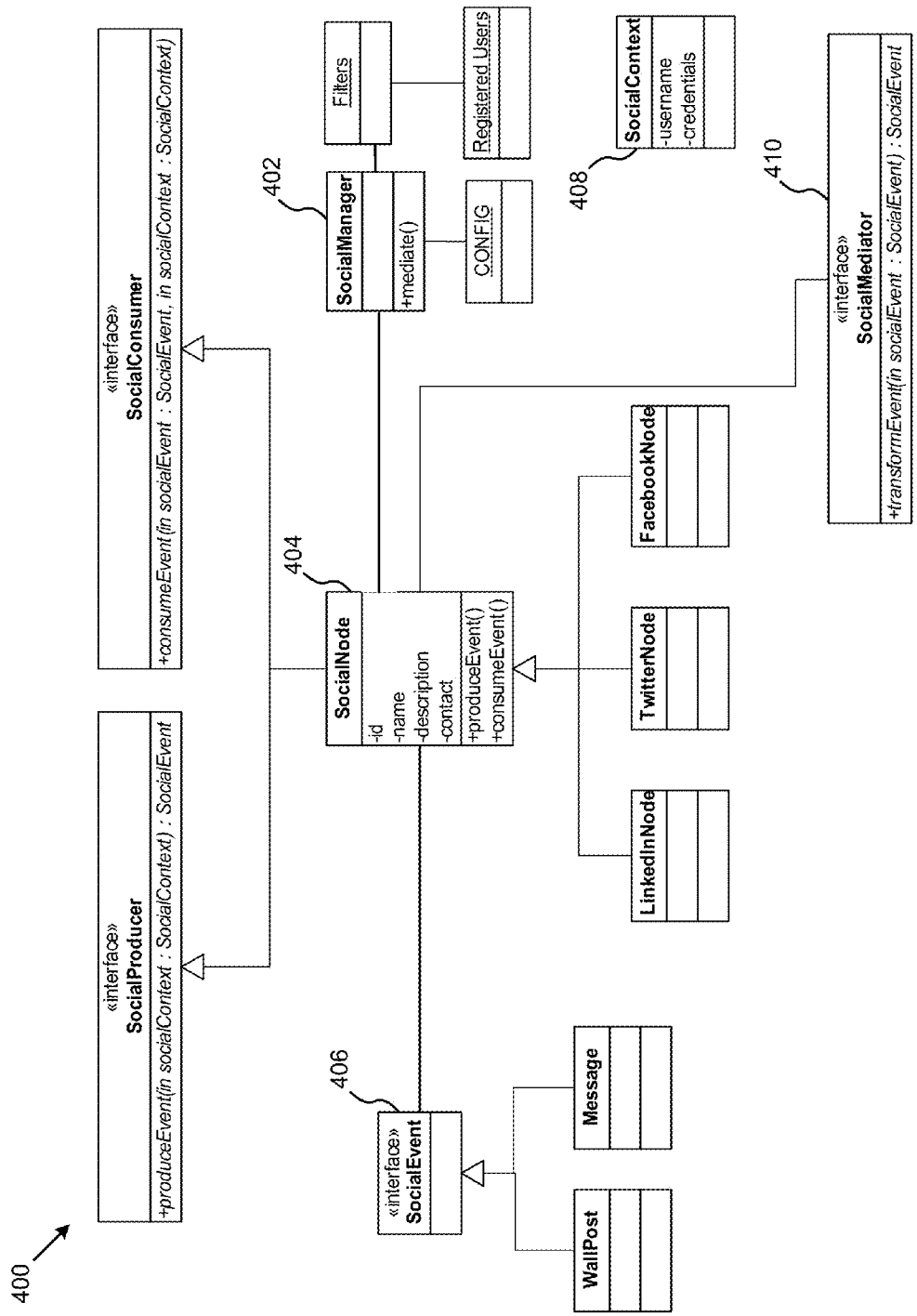
FIG. 4 is a diagrammatic representation of an object-oriented class hierarchy as used to implement a configurable platform for processing social networking site events across multiple social networking nodes, according to some embodiments.

FIG. 4 is a diagrammatic representation of an object-oriented class hierarchy 400 as used to implement a configurable platform for processing social networking site events across multiple social networking nodes. As an option, the present object oriented class hierarchy 400 or any aspect thereof may be implemented in the context of the architecture and functionality of the embodiments described herein. Also, the object oriented class hierarchy 400 or any aspect thereof may be implemented in any desired environment.

As shown, the class SocialNode 404 interacts with other classes, namely the class SocialManager 402 and class SocialEvent 406. Any class can comprise additional hierarchical levels of classes. For example, SocialNode 404 can include a class LinkedInNode, and/or a class TwitterNode, and/or a class FacebookNode and so on. A SocialEvent object might contain an indication of an social event type. The shown classes SocialNode and SocialEvent can be implemented as a Java interface or abstract base class that defines interfacing nature for a node and an event.

In some cases a producer/consumer interface defines the basic behaviour of a node. As shown, a node object produce and/or consume SocialEvents within the platform. Strictly as examples:

The SocialManager 402 initiates a process of mediating between nodes using the configuration, filters and registered users (e.g., registered social site users or applications).

The mediation process commence when a SocialEvent is produced by one node and needs to be sent to another node (e.g., in accordance with a configuration record).

The SocialContext class 408 contains credential related information (e.g., authorizations, tokens, identifiers, usernames, etc.) that may be required by the security layer.

The SocialMediator class 410 implements logic to convert between SocialEvent types.

Referring again to FIG. 3, the mapping layer 308 can implement mapping information such as is given in Table 3. A class such as a SocialContext class can implement a mapping (e.g., via any method in its class or any methods callable from a method in its class) to carry out mappings such as are given in Table 3.

TABLE 3

| Mapping information | | | |
|---|---|---|---|
| SocialEvent | SocialNode | Class | Method |
| Wall Post | FB | oracle.apps.social.FBImpl | postOnWall |
| Wall Post | LINKEDIN | oracle.apps.social.LinkedInImpl | addToActivitystream |
| Wall Post | TWITTER | oracle.apps.social.TwitterImpl | Tweet |
| Media Post | MYSPACE | oracle.apps.social.MySpaceImpl | addMedia |

Referring to the operations and objects disclosed herein, several examples are now discussed.

Example 1

Consider the following: A user has the both a SocialNode for LinkedIn and a SocialNode for Twitter activated in the user's profile within the social integration platform. When a tweet occurs that corresponds to a person or group for which the user is a follower, this tweet is registered in the platform as a SocialEvent of Type "Message", then:

The social integration platform pulls the latest tweets using a Twitter API.

The exchange mediation layer 146 examines the user's profile and notes a configuration setting to make a "Message" available to the user's LinkedIn SocialNode.

The exchange mediation layer examines further configuration information and determines that the LinkedIn SocialNode supports a SocialEvent of type "Message".

The integration layers 140 within the social integration platform 120 establishes credentials for the LinkedIn API call and prepares the API call parameters.

The LinkedIn SocialNode is updated with a new notification item.

Example 2

Consider the following: A user has the both a SocialNode for LinkedIn and a SocialNode for Facebook activated in the user's profile within the social integration platform. When the user posts an image link to their Facebook wall, this event is received by, and registered in, the social integration platform as a SocialEvent of Type "WallPost". Then:

The social integration platform retrieves a set of the most recent wall postings (e.g., a Facebook public wall post) via a Facebook API.

The exchange mediation layer examines the user's profile and retrieves a configuration setting to make a "WallPost" type of SocialEvents available to the LinkedIn SocialNode.

The exchange mediation layer examines configuration information and determines that the LinkedIn SocialNode supports a SocialEvent of type "WallPost".

The exchange mediation layer calls a mediation method passing the SocialEvent as retrieved using the Facebook API (and subsequently possibly modified). Such modification can include modifying a header, modifying a destination address, modifying a source address, modifying a format, modifying message content, etc.

The social integration layer (e.g., an integration module) establishes credentials for the LinkedIn API call and prepares the API call parameters.

The LinkedIn SocialNode is updated with a new activity item.

Example 3

Consider the following: A user expresses interest in using features of the social integration platform. The user can configure:

The SocialNodes of interest.

Identify the SocialEvent types that they want to share across those SocialNodes.

In identifying the SocialEvent types the user can also explicitly or implicitly define the direction of information flow between the given social sites. A direction can be unidirectional or bidirectional. An exchange mediation layer can use date and time stamps and can generate unique event IDs, which in turn can be used to circumvent the possibility of a race condition developing (e.g., in the case of a bidirectional exchange).

During the course of information exchange, various processing can be performed to infer metadata and/or to operate analytics over an occurrence of a SocialEvent and/or its contents (e.g., to identify the presence of trending keywords in posts).

The foregoing examples have been discussed with reference to SocialEvent types of "Message" and "WallPost". Such types are illustrative, and are not intended to be limiting of the claims.

Figure 5:
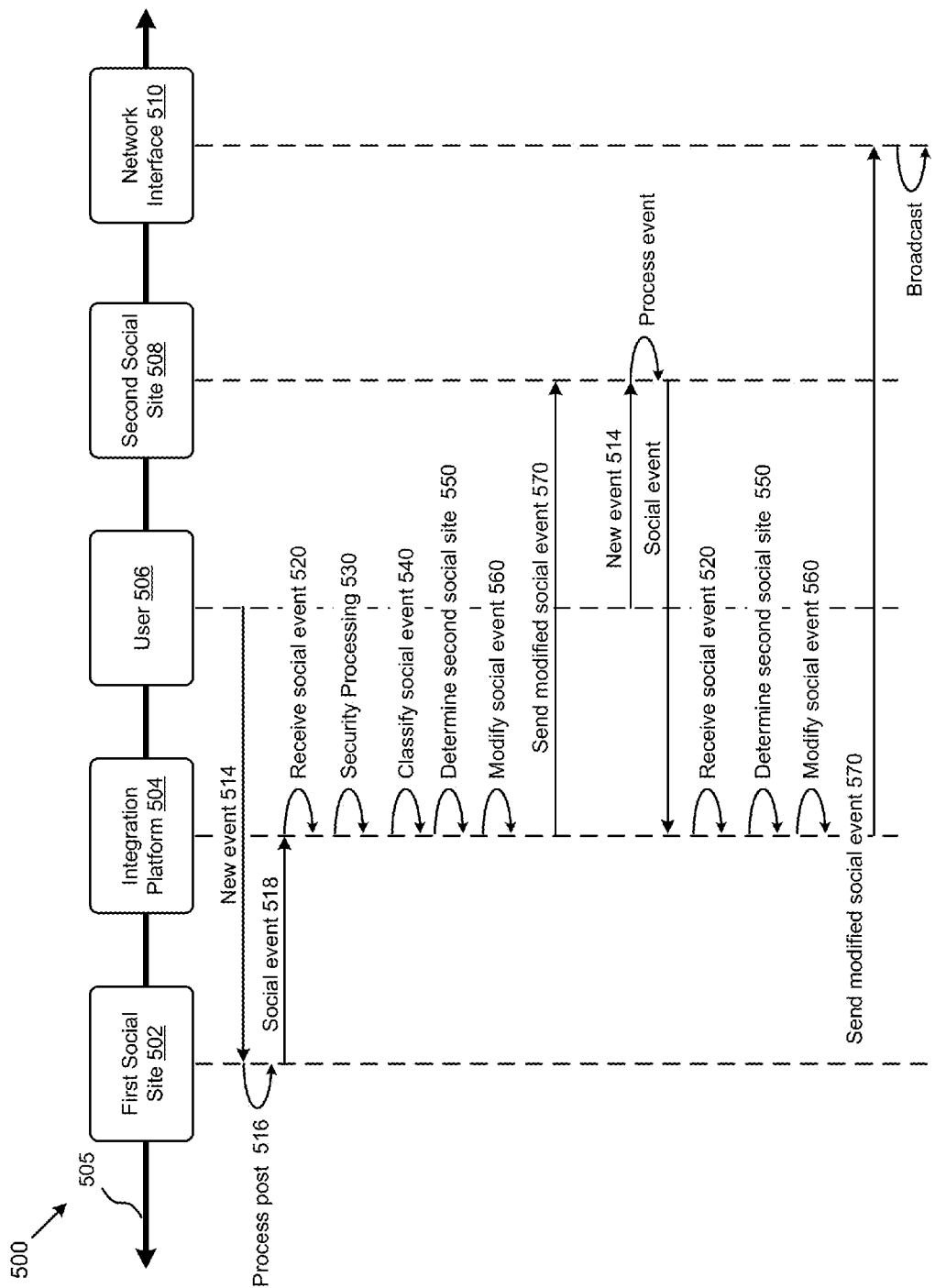
FIG. 5 is a diagram of a processing protocol as used to implement a configurable platform for processing social networking site events across multiple social networking nodes, according to some embodiments.

FIG. 5 is a diagram of a processing protocol 500 as used to implement a configurable platform for processing social networking site events across multiple social networking nodes. As an option, the present processing protocol 500 or any aspect thereof may be implemented in the context of the architecture and functionality of the embodiments described herein. Also, the processing protocol 500 or any aspect thereof may be implemented in any desired environment.

The diagram depicts multiple computing engines, each computing engine comprising a processor and memory, the memory serving to store program instructions corresponding to operations and message passing. As shown, operations and message passing can be implemented in whole or in part using program instructions accessible by an engine. Any engine can communicate with any other engines over path 505. The engines of the system can, individually or in combination, perform method operations. Any messages passed or operations performed may occur or be performed in any order unless as may be specified in the claims.

The embodiment of FIG. 5 shows a first social site 502, a second social sites 508, an integration platform 504, and interactions with a user 506. The interactions implement a protocol to perform as follows: A user 506 raises a new event at a first social site (see message 514), and the first social site 502 processes the post (see operation 516). An integration platform receives a social event from a first social site (see message 518 and operation 520), performs security processing on the social event (see operation 530), classifies the social event into at least one classification (see operation 540), identifies or otherwise determines a second social site based on the classification (see operation 550), and modifies at least some aspect of the social event to create a modified social event (see operation 560). The modification of the social event can include, without limitation, modifying a header, modifying a destination address, modifying a source address, modifying a format, modifying message content, etc. The protocol contacts a network interface 510, which in turn serves to broadcast the modified social event to additional social sites including the identified second social site (see message 570).

ADDITIONAL EMBODIMENTS OF THE DISCLOSURE

Additional Practical Applications

Figure 6:
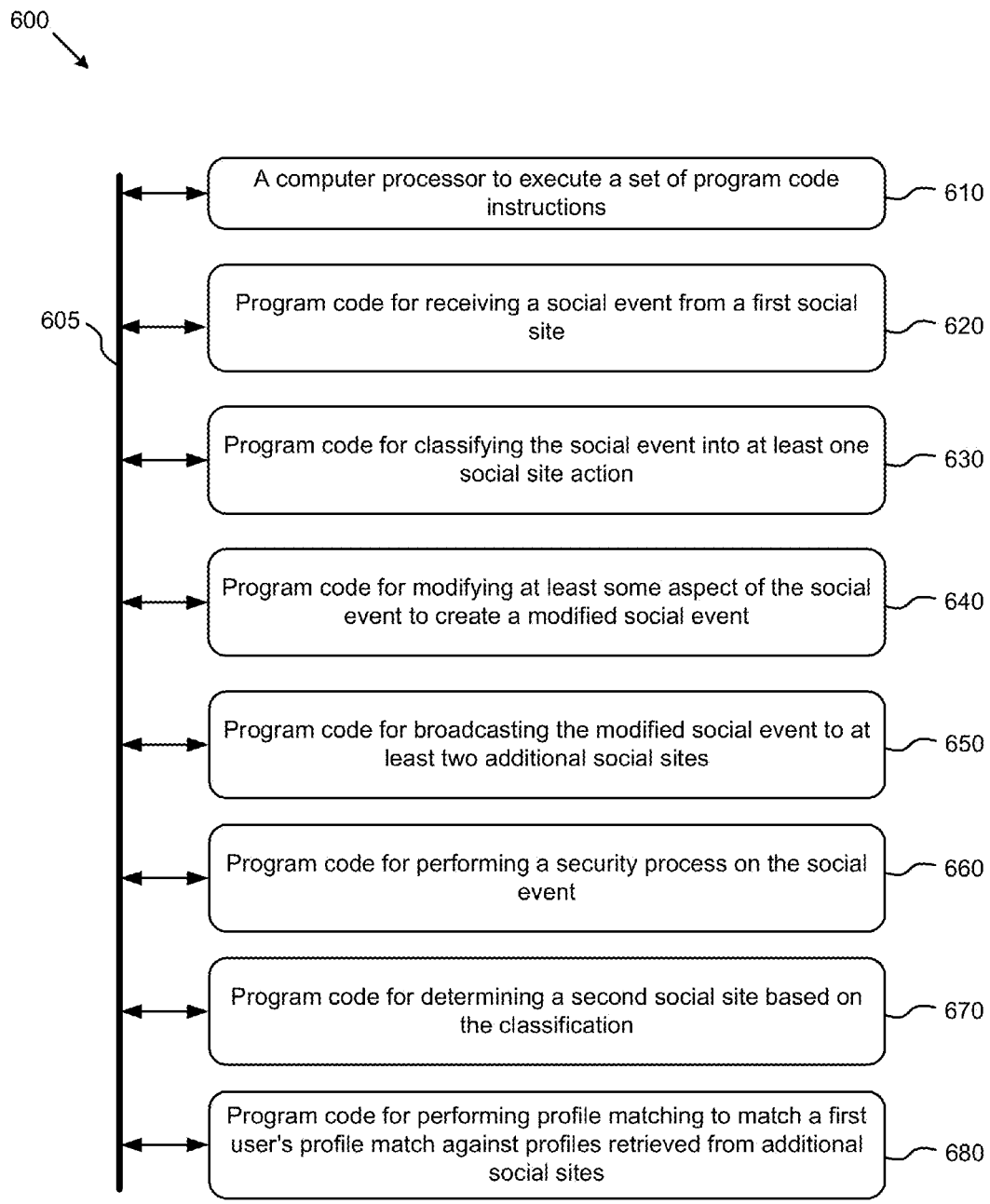
FIG. 6 is a block diagram of a system for a configurable platform for processing social networking site events across multiple social networking nodes, according to some embodiments.

FIG. 6 is a block diagram of a system for a configurable platform for broadcasting social networking site events across multiple social networking nodes, according to some embodiments. As an option, the present system 600 may be implemented in the context of the architecture and functionality of the embodiments described herein. Of course, however, the system 600 or any operation therein may be carried out in any desired environment.

As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: receiving a social event from a first social site (see module 620); classifying the social event into at least one social site action (see module 630); modifying at least some aspect of the social event to create a modified social event (see module 640); and broadcasting the modified social event to at least two additional social sites (see module 650). Some embodiments may also perform steps for performing a security process on the social event (see module 660), identifying or otherwise determining a second social site based on the classification (see module 670), and/or performing profile matching to match a first user's profile match against profiles retrieved from additional social sites (see module 680).

Figure 7:
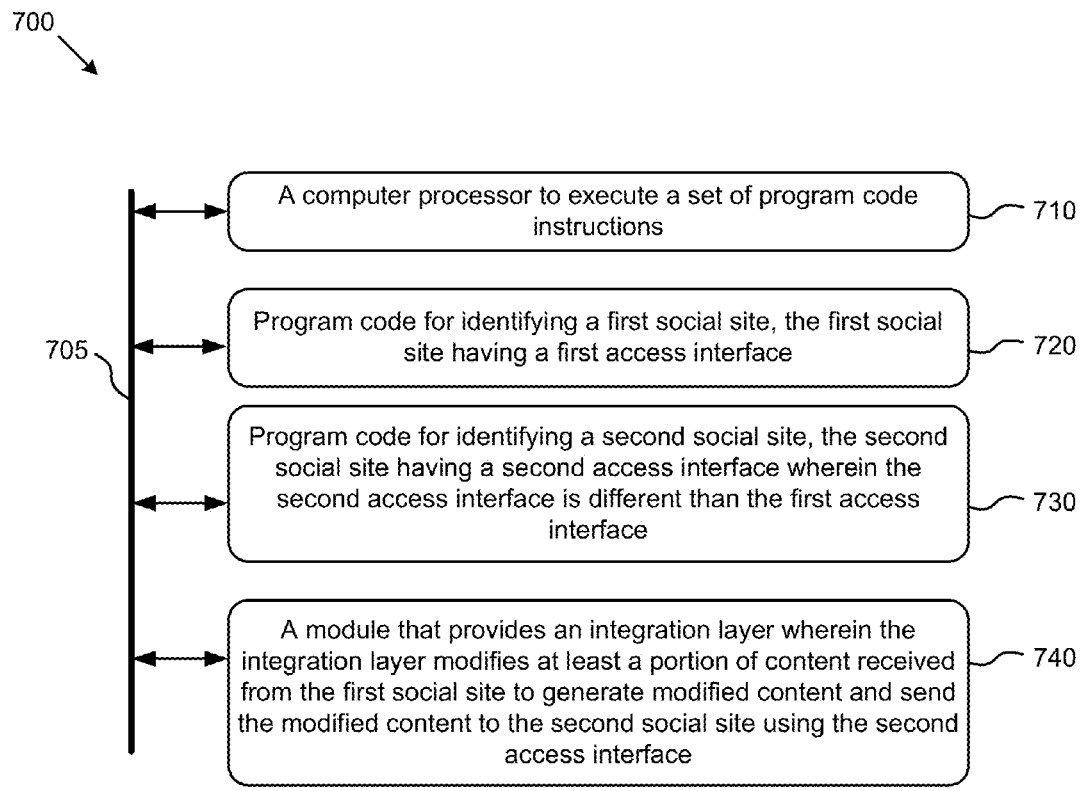
FIG. 7 is a block diagram of a system for a configurable platform for processing social networking site events across multiple social networking nodes, according to some embodiments.

FIG. 7 is a block diagram of a system for a configurable platform for processing social networking site events across multiple social networking nodes, according to some embodiments. As an option, the present system 700 may be implemented in the context of the architecture and functionality of the embodiments described herein. Of course, however, the system 700 or any operation therein may be carried out in any desired environment.

As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The system 700, comprises a computer processor to execute a set of program code instructions (see module 710) and modules for accessing memory to hold program code instructions to perform: identifying a first social site, the first social site having a first access interface (see module 720); identifying a second social site, the second social site having a second access interface wherein the second access interface is different than the first access interface (see module 730); and a module that provides an integration layer wherein the integration layer modifies at least a portion of content received from the first social site to generate modified content and send the modified content to the second social site using the second access interface (see module 740).

System Architecture Overview

Additional Practical Applications

Figure 8:
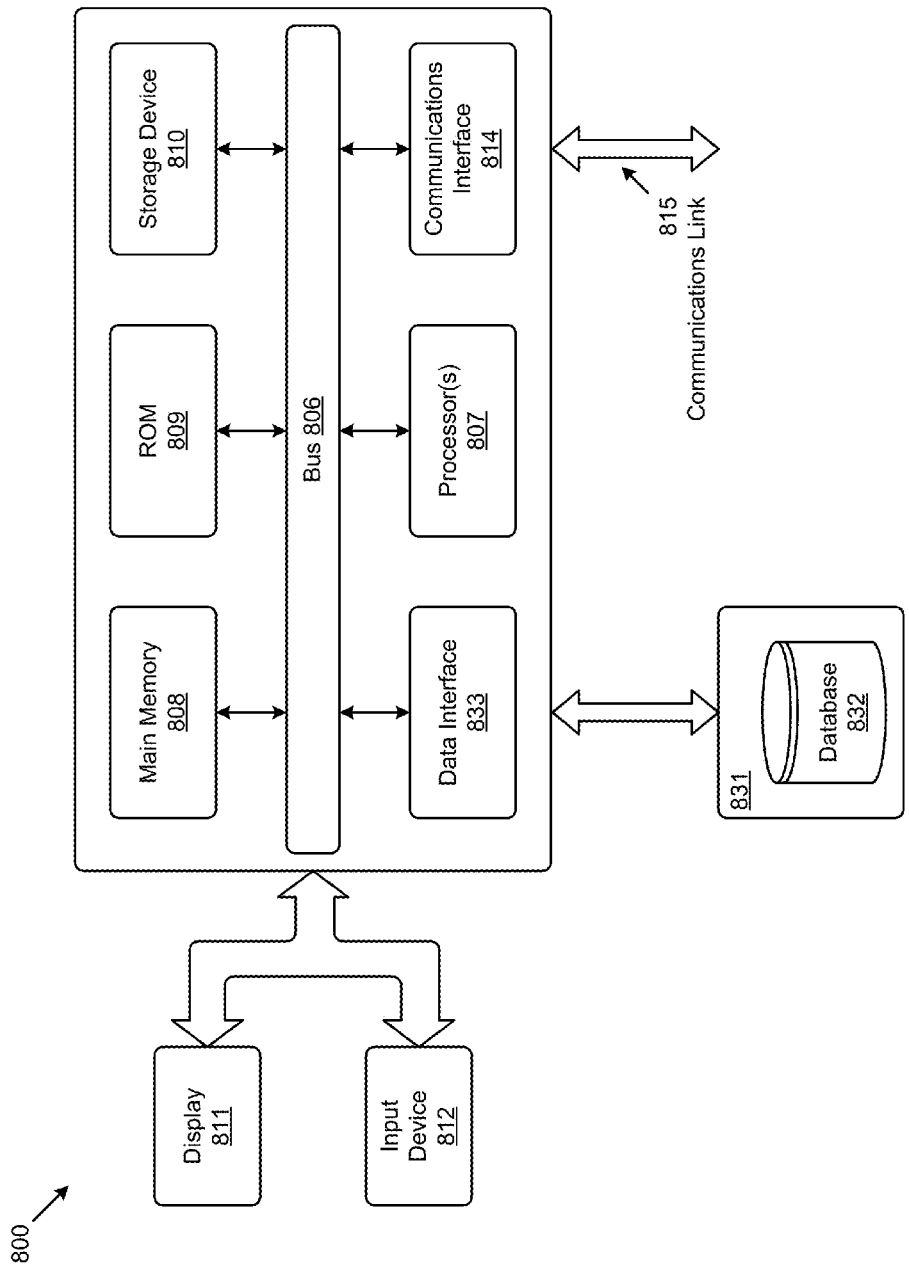
FIG. 8 depicts a block diagram of an instance of a computer system suitable for implementing an embodiment of the present disclosure.

FIG. 8 depicts a block diagram of an instance of a computer system 800 suitable for implementing an embodiment of the present disclosure. Computer system 800 includes a bus 806 or other communication mechanism for communicating information, which interconnects subsystems and devices, such as a processor 807, a system memory 808 (e.g., RAM), a static storage device (e.g., ROM 809), a disk drive 810 (e.g., magnetic or optical), a data interface 833, a communication interface 814 (e.g., modem or Ethernet card), a display 811 (e.g., CRT or LCD), input devices 812 (e.g., keyboard, cursor control), and an external data repository 831.

According to one embodiment of the disclosure, computer system 800 performs specific operations by processor 807 executing one or more sequences of one or more instructions contained in system memory 808. Such instructions may be read into system memory 808 from another computer readable/usable medium, such as a static storage device or a disk drive 810. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 800. According to certain embodiments of the disclosure, two or more computer systems 800 coupled by a communications link 815 (e.g., LAN, PTSN, or wireless network) may perform the sequence of instructions required to practice the disclosure in coordination with one another.

Computer system 800 may transmit and receive messages, data, and instructions, including programs (e.g., application code), through communications link 815 and communication interface 814. Received program code may be executed by processor 807 as it is received, and/or stored in disk drive 810 or other non-volatile storage for later execution. Computer system 800 may communicate through a data interface 833 to a database 832 on an external data repository 831. A module as used herein can be implemented using any mix of any portions of the system memory 808, and any extent of hard-wired circuitry including hard-wired circuitry embodied as a processor 807.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method using a processor to perform one or more steps, the steps comprising:

identifying a first social site, the first social site having a first access interface comprising a first application programming interface (API) specific to the first social site;

identifying a social event corresponding to a post on the first social site or a message on the first social site at the first social site, the social event corresponding to a first event type;

sharing the social event from the first social site to a second social site by implementing an integration platform located separate from social sites, the sharing comprising the steps of:

(1) receiving the social event from the first social site, (2) identifying the second social site associated with a user that created the social event at the first social site, the second social site identified on a basis of having a supported event type that corresponds to the first event type associated with the social event, the second social site having a second access interface that comprises a second API specific to the second social site and which is different from the first access interface; and (3) modifying the social event into a modified social event of the supported event type for the second social site;

sending the modified social event of the supported event type to the second social site through the second access interface having the second API specific to the second social site;

creating the social event on the first social site by interacting with an application, wherein creation of the social event results in sending the social event to the first social site over a request path, the first social site responding to the social event with an acknowledgement that the first social site processed the social event;

perform security processing on the social event;

classifying the social event into at least one classification;

performing mapping to standardize a set of common social networking concepts, wherein a mapping function comprises:

receiving the social event from the first social site;

determining semantics in the social event from the first social site, and mapping the social event from the first social site to a second social event on a second social event; and contacting a network interface to broadcast the modified social event to additional sites, wherein the integration platform is configured by configuration data, wherein the configuration data comprises user preferences, wherein the modifying the social event into a modified social event further comprises at least one of modifying a header, modifying a destination address, modifying a source address, modifying a format, or modifying a message content.

2. The method of claim 1, wherein the supported event type is either a same event type or a different event type.

3. The method of claim 1, wherein the second social site is identified based at least in part on a classification.

4. The method of claim 1, further comprising identifying additional social sites based at least in part on a classification.

5. The method of claim 4, further comprising performing profile matching to match a first user's profile match against profiles retrieved from additional social sites.

6. The method of claim 5, wherein the profile matching comprises matching against profiles corresponding to a set of users who are online.

7. The method of claim 5, wherein the profile matching comprises matching at least by comparing demographics or by matching user interests.

8. The method of claim 1, further comprising broadcasting the modified social event to an additional social site.

9. The method of claim 1, wherein the social event comprises at least a portion of at least one of, a wall post, a status update, a news feed, a like, and a friend recommendation.

10. A computer program product embodied in a non-transitory computer readable medium, the non-transitory computer readable medium having stored thereon a sequence of instructions which, when executed by a processor causes the processor to execute a process, the process comprising:

identifying a first social site, the first social site having a first access interface comprising a first application programming interface (API) specific to the first social site;

identifying a social event corresponding to a post on the first social site or a message on the first social site at the first social site, the social event corresponding to a first event type; sharing the social event from the first social site to a second social site by implementing an integration platform located separate from social sites, the sharing comprising the steps of:

(1) receiving the social event from the first social site;

(2) identifying the second social site associated with a user that created the social event at the first social site, the second social site identified on a basis of having a supported event type that corresponds to the first event type associated with the social event, the second social site having a second access interface that comprises a second API specific to the second social site and which is different from the first access interface; and (3) modifying the social event into a modified social event of the supported event type for the second social site; and sending the modified social event of the supported event type to the second social site through the second access interface having the second API specific to the second social site;

creating the social event on the first social site by interacting with an application, wherein creation of the social event results in sending the social event to the first social site over a request path, the first social site responding to the social event with an acknowledgement that the first social site processed the social event;

perform security processing on the social event;

classifying the social event into at least one classification;

performing mapping to standardize a set of common social networking concepts, wherein a mapping, function comprises:

receiving the social event from the first social site;

determining semantics in the social event from the first social site, and mapping the social event from the first social site to a second social event on a second social event;

contacting a network interface to broadcast the modified social event to additional sites, wherein the integration platform is configured by configuration data, wherein the configuration data comprises user preferences, wherein the modifying the social event into a modified social event further comprises at least one of modifying a header, modifying a destination address, modifying a source address, modifying a format, or modifying a message content.

11. The computer program product of claim 10, wherein the supported event type is either a same event type or a different event type.

12. The computer program product of claim 10, wherein the second social site is identified based at least in part on a classification.

13. The computer program product of claim 10, further comprising program code for identifying additional social sites based at least in part on a classification.

14. The computer program product of claim 13, further comprising program code for performing profile matching to match a first user's profile match against profiles retrieved from the additional social sites.

15. The computer program product of claim 14, wherein the profile matching comprises matching by user interests.

16. A computer system comprising:

a processor;

a memory comprising computer code executed using the processor, in which the computer code implements:

a computing platform to:

identify a first social site, the first social site having a first access interface comprising a first application programming interface (API) specific to the first social sites identifying a social event corresponding to a post on the first social site or a message on the first social site at the first social site, the social event corresponding to a first event type;

sharing the social event from the first social site to a second social site by implementing an integration platform located separate from social sites, the sharing comprising the steps of:

(1) receiving the social event from the first social site;
(2) Identifying the second social site associated with a user that created the social event at the first social site, the second social site identified on a basis of having a supported event type that corresponds to the first event type associated with the social event, the second social site having a second access interface, that comprises a second API specific to the second social site and different from the first access interface; and
(3) modifying the social event into a modified social event of the supported event type for the second social site; and sending the modified social event of the supported event type to the second social site through the second access interface having the second API specific to the second social site;

creating the social event on the first social site by interacting with an application, wherein creation of the social event results in sending the social event to the first social site over a request path, the first social site responding to the social event with an acknowledgement that the first social site processed the social event;

perform security processing on the social event;

classifying the social event into at least one classification;

performing mapping to standardize a set of common social networking concepts, wherein a mapping function comprises:

receiving the social event from the first social site;

determining semantics in the social event from the first social site, and mapping the social event from the first social site to a second social event on a second social event;

contacting a network interface to broadcast the modified social event to additional sites, wherein the integration platform is configured by configuration data, wherein the configuration data comprises user preferences, wherein the modifying the social event into a modified social event further comprises at least one of modifying a header, modifying a destination address, modifying a source address, modifying a format, or modifying a message content.

17. The computer system of claim 16, wherein the supported event type is either a same event type or a different event type.

18. The computer system of claim 16, further comprising program code for identifying additional social sites based at least in part on a classification.

19. The computer system of claim 18, further comprising program code for performing profile matching to match a first user's profile match against profiles retrieved from the additional social sites.

20. The computer system of claim 19, the profile matching comprising matching against profiles corresponding to a set of users who are online.

21. The computer system of claim 19, wherein the profile matching comprises matching at least by comparing demographics or by matching user interests.

22. The computer system of claim 16, further comprising broadcasting the modified social event to an additional social site.

23. The computer system of claim 16, wherein the social event comprises at least one of, a wall post, a status update, a news feed, a like, and a friend recommendation.

* * * * *

UNITED STATES PATENT AND TRADEMARK OFFICE
CERTIFICATE OF CORRECTION

PATENT NO. : 9,819,759 B2  
APPLICATION NO. : 14/074630  
DATED : November 14, 2017  
INVENTOR(S) : Madhavan et al.

Page 1 of 1

It is certified that error appears in the above-identified patent and that said Letters Patent is hereby corrected as shown below:

In the Specification

In Column 16, Line 9, delete "PTSN," and insert -- PSTN, --, therefor.

In the Claims

In Column 16, Line 51, in Claim 1, delete "site," and insert -- site; --, therefor.

In Column 18, Line 21, in Claim 10, delete "mapping," and insert -- mapping --, therefor.

In Column 19, Line 2, in Claim 16, delete "Identifying" and insert -- identifying --, therefor.

Signed and Sealed this  
Twenty-sixth Day of June, 2018

Andrei Iancu  
*Director of the United States Patent and Trademark Office*